US008875298B2

(12) United States Patent
Li et al.

(10) Patent No.: US 8,875,298 B2
(45) Date of Patent: Oct. 28, 2014

(54) METHOD FOR SCALABLE ANALYSIS OF ANDROID APPLICATIONS FOR SECURITY VULNERABILITY

(71) Applicant: NEC Laboratories America, Inc., Princeton, NJ (US)

(72) Inventors: Zhichun Li, Plainsboro, NJ (US); Long Lu, Atlanta, GA (US); Zhenyu Wu, Virginia, VA (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/768,439

(22) Filed: Feb. 15, 2013

(65) Prior Publication Data

US 2014/0059690 A1 Feb. 27, 2014

Related U.S. Application Data

(60) Provisional application No. 61/599,670, filed on Feb. 16, 2012.

(51) Int. Cl.
*G06F 21/57* (2013.01)
*G06F 11/36* (2006.01)
*G06F 21/56* (2013.01)

(52) U.S. Cl.
CPC .......... *G06F 21/577* (2013.01); *G06F 11/3604* (2013.01); *G06F 21/562* (2013.01); *G06F 2221/033* (2013.01)
USPC .......................................................... 726/25

(58) Field of Classification Search
None
See application file for complete search history.

(56) References Cited

U.S. PATENT DOCUMENTS 8,549,656 B2 * 10/2013 Blaisdell et al. ................ 726/27

FOREIGN PATENT DOCUMENTS

KR 101214893 * 1/2013

OTHER PUBLICATIONS

Thomas Biasing, "An Android Application Sandbox System for Suspicious Software Detection", 2010, pp. 55-62.*
Takamasa Ishora, "Kernel Based Behavior Analysis for Android Malware Detection", 2011, pp. 1011-1015.*
Jinseong Jeon, "Dr. Android and Mr. Hide: Fine-grained security policies on unmodified Android", Dec. 9, 2011, pp. 1-14.*
William Enck, TaintDroid: An Information-Flow Tracking System for Realtime Privacy Monitoring on Smartphones, Oct. 10, 2010, pp. 1-15.*
Omer Tripp, "TAJ:Effective Taint Analysis of Web Applications", 2009, pp. 1-11.*

* cited by examiner

*Primary Examiner* — Jeffrey Pwu
*Assistant Examiner* — Wasika Nipa
(74) *Attorney, Agent, or Firm* — Joseph Kolodka

(57) ABSTRACT

A method for scalable analysis of Android applications for security includes applying Android application analytics to an Android application, which in turn includes applying an application taint tracking to the Android application and applying application repacking detection to the Android application, and determining security vulnerabilities in the Android application responsive to the analytics.

12 Claims, 3 Drawing Sheets

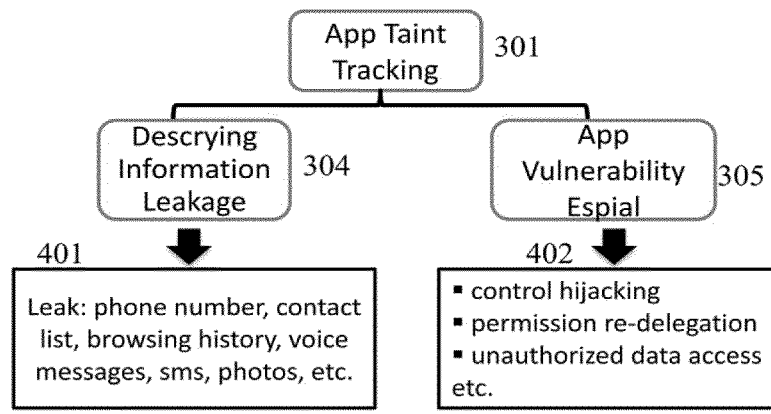
Fig. 4
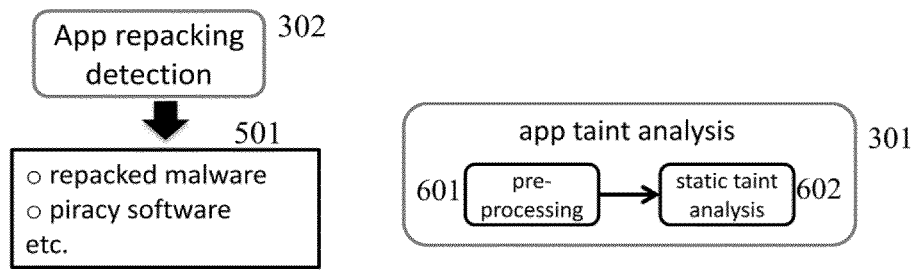
Fig. 5
Fig. 6
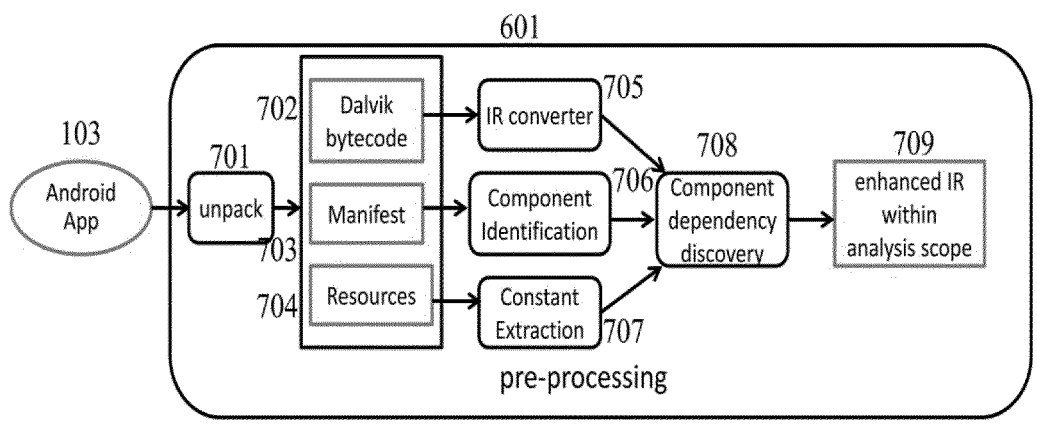
Fig. 7

METHOD FOR SCALABLE ANALYSIS OF ANDROID APPLICATIONS FOR SECURITY VULNERABILITY

RELATED APPLICATION INFORMATION

This application claims priority to provisional application No. 61/599,670 filed Feb. 16, 2012, the contents thereof are incorporated herein by reference

BACKGROUND OF THE INVENTION

The present invention relates generally to Android based mobile devices, and more particularly, to a method for scalable analysis of Android applications for security vulnerability.

Android as an open smartphone platform has gain tremendous popularity in recent years. According to Google, Android has reached 100 million activations all over the world. There are more than 200K applications in the official Android Market and even more in the alternative markets.

The Android applications have been installed on more than 4.5 billion onto mobile devices as of May 2011. Since the applications access critical data from users, it is important to keep the user and their apps safe. How to identify security vulnerability, information leakage and malware in those applications is a mission critical problem for smartphone carriers and hardware vendors.

Existing approaches to security vulnerability in Android systems largely focus on malware detection, but do not provide a comprehensive solution that can detect security vulnerability and information leakage simultaneously. Moreover, these existing approaches leverage on some heuristics based on some characteristics appearing in today's malware. It remains unknown whether these existing approaches can detect future malware as well. One approach leverages dynamic taint analysis for privacy leakage detection. This scheme heavily modifies the underlying OS and has high overhead. It is also hard for end-users to incorporate this approach to their smartphones. Decompiliation based approaches decompile the applications back to its source code for static analysis. These approaches have potentially legal issues since the license of the applications may not allow decompilation. Moreover, the decompilation approaches also suffer from high computation overhead and low accuracy. Another prior work identifies the permission re-delegation attacks semi-manually and proposes defense mechanism for the attacks. There is still lack of a systematic approach to detect different types of vulnerabilities with the approach of this prior work.

Accordingly, there is a need for a method for scalable analysis of Android applications for security vulnerability.

BRIEF SUMMARY OF THE INVENTION

The present invention is directed to a method for scalable analysis of Android applications for security includes applying Android application analytics to an Android application, which in turn includes applying an application taint tracking to the Android application and applying application repacking detection to the Android application, and determining security vulnerabilities in the Android application responsive to the analytics.

In an alternative embodiment of the invention, a mobile device embedded with an Android application that includes an Android application analytics module for a scalable analysis of the Android applications for security vulnerability. The application analytics module includes applying an application taint tracking to the Android application, applying application repacking detection to the Android application, and determining security vulnerabilities in the Android application responsive to the analytics module.

These and other advantages of the invention will be apparent to those of ordinary skill in the art by reference to the following detailed description and the accompanying drawings.

BRIEF DESCRIPTION OF THE DRAWINGS

FIG. 4 is a block diagram showing details of application taint tracking 301, in accordance with the invention;

FIG. 5 is a block diagram showing details of the application repacking detection 302, in accordance with the invention;

FIG. 6 is a block diagram of application (app) taint tracking analysis 301, in accordance with the invention;

FIG. 7 is a block diagram detailing the pre-processing 601 in accordance with the invention;

DETAILED DESCRIPTION

The present invention is directed to a method around a general Android application analytic framework, general, which can be employed to detect different types of aforementioned threats such as security vulnerability, information leakage, and malware, etc. The inventive method unifies the detection of all threats with a single framework and enables an efficient and effective static analysis approach to achieve that. The inventive method leverages on the uniqueness of Android applications, and the inventive method's high-precision static analysis enables detection of threats to Android applications. The inventive method is highly scalable, so it can be applied to an application store with hundreds of thousands of applications efficiently.

Figure 1:
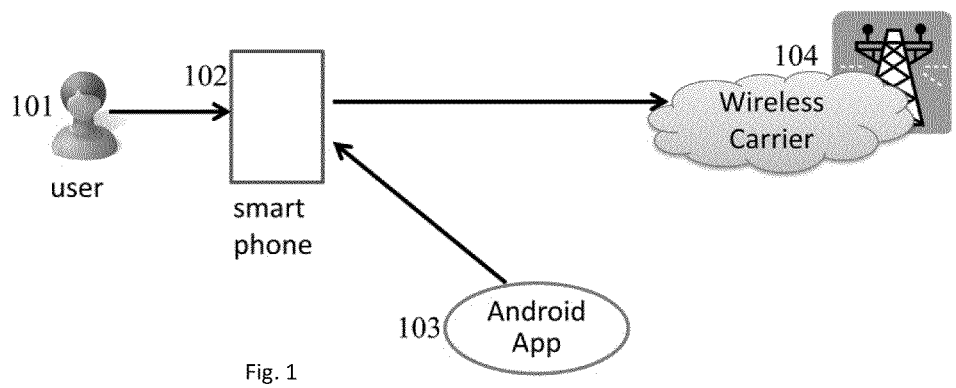
FIG. 1 is an exemplary diagram of a network environment in which the inventive method for scalable analysis of Android applications for security vulnerability can be employed. A user 101 with a smartphone or mobile device 102 operable over a wireless carrier network 104 is loaded with an Android application 103.
Figure 2:
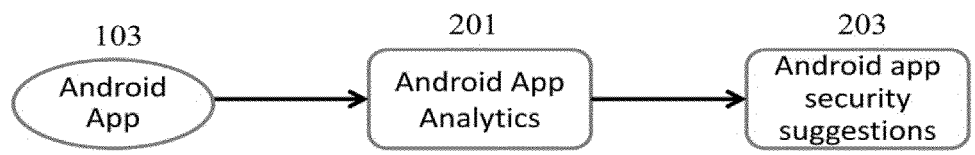
FIG. 2 is a block diagram showing an Android application 103 on a mobile device 102 subjected to Android application analytics 201 in accordance with the invention that provides Android application security vulnerability suggestions 203.
Figure 3:
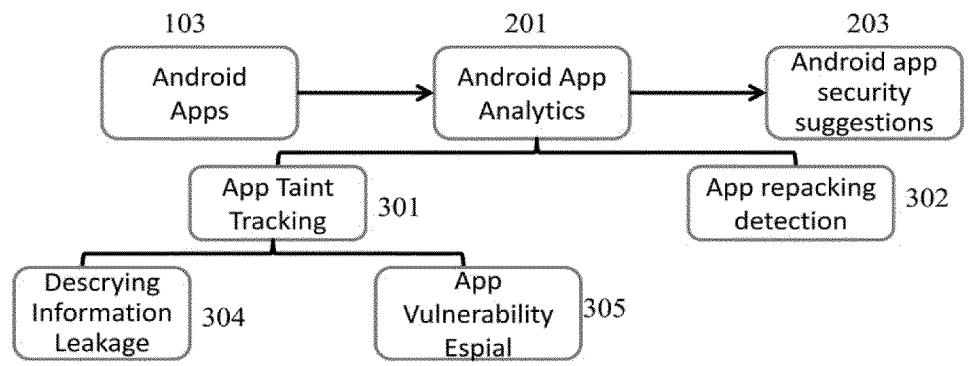
FIG. 3 is a diagram showing details of the Android application analytics 201, in accordance with the invention.
Figure 8:
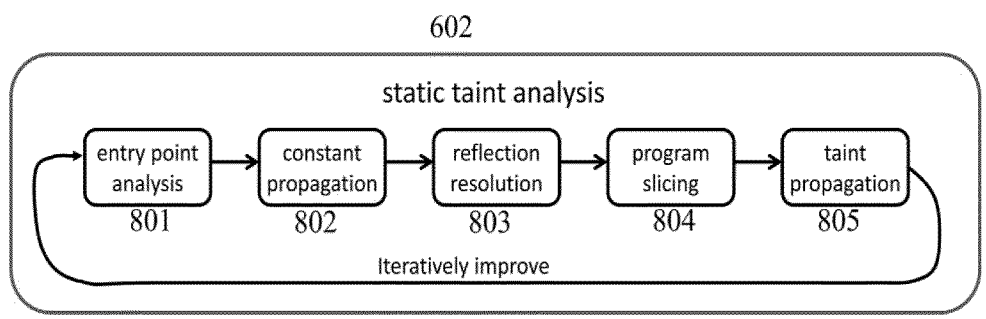
FIG. 8 is a block diagram of static taint analysis 602, in accordance with the invention.

Turning now to the diagram of FIG. 3, the Android Application (App) analytics procedure 201 of the inventive method includes application taint tracking 301 and application repacking detection 302 procedures. The application taint tracking further includes a descrying information leakage 304 and application vulnerability espial 305 procedures.

Shown in the diagram of FIG. 4, the application taint tracking 301 steps includes a descrying information leakage check 304 process and an application vulnerability espial 305 process. The descrying information leakage aspect analyzes leaks respecting smartphone information such as phone number, contacts, browsing history, voice messages, SMS text messages, photos, etc. 401. The application vulnerability espial 305 process is directed to control hijacking of the mobile device, permission re-delegation, unauthorized data access, etc. 402.

The application repacking detection 302 step, shown in FIG. 5, is directed to checking for repacked malware, piracy software, etc. 501. The application taint analysis 301 procedure includes a preprocessing 601 procedure and a static taint analysis 602 procedure.

The Android application 103 is subjected to the pre-processing 601 procedure that unpacks 701 the Android application and then Dalvik Bytecode 702, manifest 703 and resources 704 analysis are applied. The Dalvik bytecode output is directed to an IR converter 705, the manifest aspect 703 is directed to a component identification 706 step and the resources aspect includes constant extraction 707. The IR converter 705, component identification 706 and constant extraction 707 results are directed to a component dependency discovery process 708 that provides an enhanced IR within analysis scope 709.

The static taint analysis 602 includes an entry point analysis 801, a constant propagation 802 step, a reflection solution 803 step, followed by program slicing 804 and a taint propagation 805 procedure. The static taint analysis is an iterative procedure for improving the security threat analysis.

Figure 9:
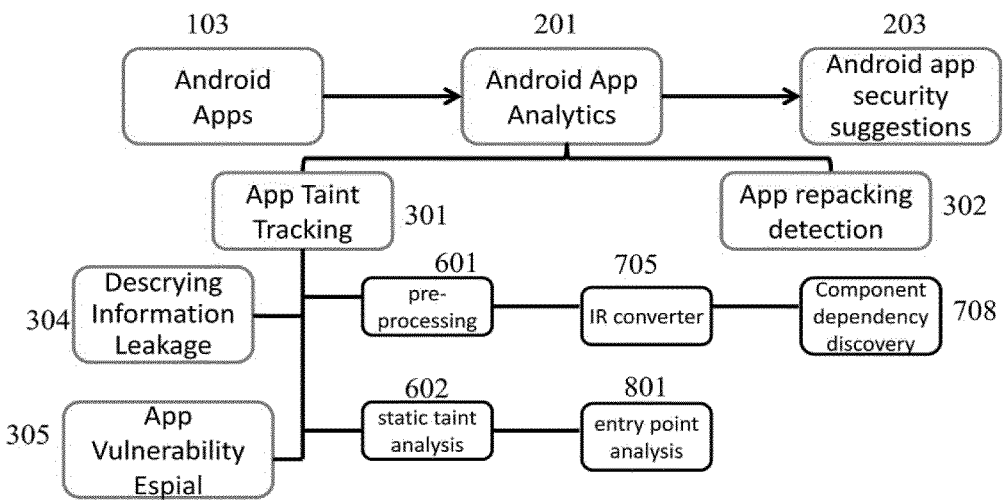
FIG. 9 is a block diagram of an overview of key aspects of the inventive method.

The overview diagram of FIG. 9 shows aspects of the inventive method detailed above. The component discovery 708 procedure and entry point analysis 801 procedure are among the innovative aspects of the present inventive method for Android application analytics for security vulnerability. In the component discovery 708 procedure, there is an inter-component analysis for Android applications. Android applications are different from traditional programs in the way they are designed to cooperate with different applications. The indents are used to communicate between components of difference applications. This inventive method is the first to utilize the indent flow statically and extract the component dependency. For the entry point analysis 801, the Android program platform is different from traditional mobile device platforms since it has multiple starting points, referred to herein as entry points. The present inventive method employs a static analysis that can discover the entry points effectively.

From the foregoing it can be appreciated that the key features of inventive method enables sound translation of an Android Dalvik bytecode to an intermediate language, which provides the foundation for the accuracy of the inventive method. Prior efforts at Android security are often unsound, whereas the inventive method will have higher accuracy in detecting security threats in an Android environment. The inventive method entails an entry-point detection for Android applications, which further improves the accuracy of the security threat detection. Moreover, the inventive method is more general and can be applied to different threats than prior techniques. The inventive method leverages on a high-precision static analysis approach, which is more scalable than dynamic based approaches.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for scalable analysis of Android applications for security vulnerability comprising:
 applying Android application analytics to an Android application, said applying comprising:
  translating an Android Dalvik bytecode to an intermediate language
 for program analysis;
  applying an application taint tracking to said Android application, wherein said application taint tracking comprises an application taint analysis that includes a preprocessing and static taint analysis of said Android application, wherein said preprocessing comprises subjecting said Android application to unpacking and component identification and constant extraction, respectively, followed by a component dependency discovery providing an enhanced IR (intermediate representation)
 the static taint analysis includes:
  automatically and iteratively performing entry point analysis;
  constant propagation;
  reflection resolution;
  program slicing;
  performing taint propagation;
  utilizing an indent flow statically to identify communication between components of different applications;
  extracting the component dependency; and
  iteratively improving static taint analysis;
 applying application repacking detection to said Android application; and
 determining security vulnerabilities in said Android application responsive to said analytics.

2. The method of claim 1, wherein said application taint tracking comprises a descrying information leakage procedure and an application vulnerability espial procedure to said Android application.

3. The method of claim 2, wherein said descrying information leakage procedure comprises leak detection of at least one of a phone number, contact list, browsing history, voice messages, SMS messages, and photos.

4. The method of claim 2, wherein said application vulnerability espial procedure comprises at least one of controlling hijack, permission re-delegation, and unauthorized data access.

5. The method of claim 1, wherein said application repacking detection comprises detecting at least one repacked malware and piracy software.

6. The method of claim 1, wherein said static taint analysis of said Android application comprises an entry point analysis, constant propagation analysis, program slicing and taint propagation analysis.

7. A mobile device embedded with an Android application comprising:
 an Android application analytics module for a scalable analysis of Android applications for security vulnerability, said application analytics module comprising computer code for:
 applying an application taint tracking to said Android application;
 translating an Android Dalvik bytecode to an intermediate language for program analysis;
 applying an application taint tracking to said Android application, wherein said application taint tracking comprises an application taint analysis that includes a preprocessing and static taint analysis of said Android application, wherein said preprocessing comprises subjecting said Android application to unpacking and component identification and constant extraction, respectively, followed by a component dependency discovery providing an enhanced IR (intermediate representation) the static taint analysis includes:
- automatically and iteratively performing entry point analysis;
- constant propagation;
- reflection resolution;
- program slicing;
- performing taint propagation;
- utilizing an indent flow statically to identify communication between components of different applications;
- extracting the component dependency; and
- iteratively improving static taint analysis;

applying application repacking detection to said Android application; and determining security vulnerabilities in said Android application responsive to said analytics.

8. The mobile device of claim 7, wherein said application taint tracking comprises a descrying information leakage procedure and an application vulnerability espial procedure to said Android application.

9. The mobile device of claim 8, wherein said descrying information leakage procedure comprises leak detection of at least one of a phone number, contact list, browsing history, voice messages, SMS messages, and photos.

10. The mobile device of claim 8, wherein said application vulnerability espial procedure comprises at least one of controlling hijack, permission re-delegation, and unauthorized data access.

11. The mobile device of claim 7, wherein said application repacking detection comprises detecting at least one repacked malware and piracy software.

12. The mobile device of claim 7, wherein said static taint analysis of said Android application comprises an entry point analysis, constant propagation analysis, program slicing and taint propagation analysis.

* * * * *